United States Patent
Le Martret et al.

(10) Patent No.: US 8,116,349 B2
(45) Date of Patent: Feb. 14, 2012

(54) METHOD OF MULTIPLE ACCESS COMMUNICATION IN A CENTRALIZED NETWORK BASED ON AN ULTRA WIDEBAND IMPULSE PHYSICAL LAYER

(75) Inventors: Christophe Le Martret, Levallois Perret (FR); Anne-Laure Deleuze, Paris (FR); Philippe Ciblat, Paris (FR)

(73) Assignee: Thales (FR)

( * ) Notice: Subject to any disclaimer, the term of this patent is extended or adjusted under 35 U.S.C. 154(b) by 637 days.

(21) Appl. No.: 12/278,679

(22) PCT Filed: Feb. 7, 2007

(86) PCT No.: PCT/EP2007/051181
§ 371 (c)(1),
(2), (4) Date: Feb. 23, 2009

(87) PCT Pub. No.: WO2007/090854
PCT Pub. Date: Aug. 16, 2007

(65) Prior Publication Data
US 2009/0147831 A1    Jun. 11, 2009

(30) Foreign Application Priority Data
Feb. 7, 2006 (FR) .................................. 06 01077

(51) Int. Cl.
H04B 1/00 (2006.01)
(52) U.S. Cl. ....................................... 375/130; 375/138
(58) Field of Classification Search .................. 375/130, 375/138, 260, 285, 346
See application file for complete search history.

(56) References Cited

U.S. PATENT DOCUMENTS

| | | | | |
|---|---|---|---|---|
| 2006/0245471 | A1* | 11/2006 | Molisch | 375/138 |
| 2007/0211786 | A1* | 9/2007 | Shattil | 375/141 |
| 2009/0028221 | A1* | 1/2009 | Sahinoglu et al. | 375/138 |

OTHER PUBLICATIONS

Deleuze A et al: "Time-Hopping Code Characterization for Multi-User Interference Mitigation in Ultra Wide Band Impulse Radio"; Signals, Systems and Computers, 2004. Conference Record of the Thirty-Eighth Asilomar Conference on Pacific Grove, CA, USA Nov. 7-10, 2004, Piscataway, NJ, USA, IEEE, (Nov. 7, 2004), pp. 617-621, XP010779897, ISBN: 0-7803-8622-1.
Le Martret C J; Deleuze A-L et al.: "Optimal Time-Hopping Codes for Multi-User Bandwidth Impulse Radio" IEEE Transactions on Wireless Communications, vol. 5, No. 6, (Jun. 30, 2006), pp. 1516-1525, XP002402926.
M.Z. Win and R.A. Scholtz, "Impulsed Radio: How It Works", IEEE Com. Letters, vol. 2, No. 2, Feb. 1998, pp. 36-38.

(Continued)

Primary Examiner — Don N Vo
(74) Attorney, Agent, or Firm — Lowe Hauptman Ham & Berner, LLP

(57) ABSTRACT

A method of multiple access communication in a centralized network is based on an ultra wideband impulse physical layer allowing code-based multiple access. Each user is associated with a code, and the transmission is performed in an asynchronous manner in a propagation medium with multiple paths. It is characterized in that a criterion is established so as to find the codes of the various users making it possible to minimize the variance of the multi-user interference at the output of a linear receiver.

4 Claims, 2 Drawing Sheets

OTHER PUBLICATIONS

M.Z. Win, X. Quiu, R.A. Scholtz, and V.O.K. Li, "ATM-Based TH-SSMA Network for Multimedia PCS", IEEE JSAC, vol. 17, No. 5, May 1999, pp. 824-836.

S.S. Kolenchery, J.K. Townsend, and J.A. Freebersyer, "A Novel Impulse Radio Network for Tactical Military Wireless Communications", IEEE MILCOM Conf., Bedford, MA, USA, Oct. 1998, pp. 59-65.

Ismail Guvenc and Huseyin Arslan, "Design and Performance Analysis of TH Sequences for UWB-IR Systems", In Proc. IEEE Wireless Commun. Networking Cong. (WCNC), vol. 2, pp. 914-919, Atlanta, GA, 2004.

C. Le Martret, G.B. Giannakis, "All-Digital Impulse Radio With Multiuser Detection for Wireless Cellular Systems", IEEE Trans. on Communications, vol. 50, No. 9, pp. 14400-1450, Sep. 2002.

M.Z. Win and R.A. Scholtz, "Impulse Radio: How It Works", IEEE Com. Letters, vol. 2, No. 2, Feb. 1998, pp. 99-36-38.

M.Z. Win, X. Qiu, R.A. Scholtz, and V.O.K. Li, "ATM-Based TH-SSMA Network for Multimedia PCS", IEEE JSAC, vol. 17, No. 5, May 1999, pp. 824-836.

S.S. Kolenchery, J.K. Townsend, and J.A. Freebersyer, "A Novel Impulse Radio Network for Tactical Military Wireless Communications", IEEE MILCOM Conf., Bedford, MA, USA, Oct. 1998, pp. 59-65.

* cited by examiner

METHOD OF MULTIPLE ACCESS COMMUNICATION IN A CENTRALIZED NETWORK BASED ON AN ULTRA WIDEBAND IMPULSE PHYSICAL LAYER

CROSS-REFERENCE TO RELATED APPLICATIONS

The present Application is based on International Application No. PCT/EP2007/051181, filed on Feb. 7, 2007, which in turn corresponds to French Application No. 0601077 filed on Feb. 7, 2006, and priority is hereby claimed under 35 USC §119 based on these applications. Each of these applications are hereby incorporated by reference in their entirety into the present application.

FIELD OF THE INVENTION

The invention relates notably to a method and system of communication in a communications network supporting a physical layer of ultra wideband impulse type, otherwise termed UWB (Ultra Wide Band) and IR (Impulse Radio) respectively.

BACKGROUND OF THE INVENTION

A wideband or UWB-IR (ultra wide band Impulse Radio) transmission uses the whole of the band of the channel, thereby requiring the use of time division duplexing (TDD) to exchange data between two nodes. As a result, naturally, the access scheme used for this kind of transmission is time division multiple access (TDMA, AMRT in French).

Moreover, it is known that systems using TDMA are limited in capacity and the product of the number of users times the useful throughput per user is constant.

A way to increase the bandwidth of such a network is, for example, to combine a code division multiple access (CDMA) technique with TDMA which then allows several users to transmit during one and the same time horizon. CDMA in UWB-IR is made possible by the use of time-hopping codes (THC).

Like all code division multiple access CDMA systems, UWB-IR-THC (use of time-hopping codes) suffers from the phenomenon of interference caused by other users (MUI: Multi-User Interference).

In a general way, several schemes are potentially possible for reducing or canceling the phenomenon of multi-user interference or MUI. When restricting oneself to low-cost, low-consumption implementation solutions, one is then reduced to analog linear receivers of "rake" type where the decision is taken on a linear combination of delayed versions of the signal received. The only relevant parameter left in the design of the system for performance optimization is the datum of the time-hopping code. It is then possible to find a criterion which allows minimization of the output variance of the MUI at the output of the receiver and therefore enables the best performance to be ensured.

The transmission system's physical layer proposed according to the invention is, notably, based on the UWB-IR ultra wideband impulse technology.

The principle of UWB-IR is to transmit the information by means of very short impulses (of the order of a nanosecond) in baseband.

UWB-IR-THC transmission systems have essentially been described at the level of the physical layer, for example in document [1]. The idea of the THC is to transmit the impulses by spacing them out temporally in a pseudo-random manner, each user having his own sequence. In principle this allows use of UWB in an asynchronous multi-user context. The use of this physical layer in practical systems is described for example in the two articles [2] and [3].

However, no prior art reference describes the way to achieve a multiple access system based on the use of time-hopping codes.

To the knowledge of the applicant, the only solutions proposed up till now for constructing the codes consist in applying the results of constructing codes dedicated to different transmission systems (essentially dedicated to frequency hopping). An example is given in document [4]. These codes fall into the class of congruent codes, but do not comply with the criterion for minimizing the variance of the MUI considered here.

More recently, work published in [5] shows how to characterize the best codes (within the sense of the minimum variance of the MUI) for a UWB-IR transmission using amplitude modulation (PAM: Pulse Amplitude Modulation).

SUMMARY OF THE INVENTION

The idea of the present invention relates notably to systems using position based modulation or PPM (standing for Pulse Position Modulation).

The invention relates to a method of multiple access communication in a centralized network based on an ultra wideband impulse physical layer allowing multiple access based on time-hopping codes, each user being associated with a code, the transmission being performed in an asynchronous manner in a propagation medium with multiple paths, characterized in that a criterion is established so as to find the codes of the Nu various users making it possible to minimize the variance of the multi-user interference $J_n$ at the output of a linear receiver, the signal received r(t) originating from a user being expressed in the form of a sum of the signal of interest $r_n(t)$ originating from user n and of a term corresponding to the multi-user interference, $J_n$ where $r(t)=r_n(t)+J_n+n(t)$ with $$r_n(t) = \sum_{k=1}^{N_p} A_n^k s_n(t - \tau_n^k)$$

where $A_n^k$ and $\tau_n^k$ are respectively the amplitude and the delay of the kth path of the transmission channel between user n and the receiver,
and in that to determine the codes of the users use is made of the partial cyclic inter-correlations of the codes which satisfy the following criteria:

$$\sum_{q=0}^{N_c N_f - 1} [C_{m,n}^{+2}(q) + C_{m,n}^{-2}(q)] = N_f^2,$$

$$\sum_{q=0}^{N_c N_f - 1} C_{m,n}^{+}(q) C_{m,n}^{-}(q) = 0,$$

for m=1, K, $N_u$, n=1, K, $N_u$ and n≠m, where $N_f$ is the number of frames, $N_c$ is the number of chips, and $N_u$ is the number of users transmitting to the central point or the number of point to point links simultaneously transmitting in a point to point centralized network.

The communications between the users are, for example, point to point or multi-point to point communications.

The present invention applies, for example, in respect of communications in a network of potentially mobile terminals, for which the users communicate either towards a central point (base station B) commonly called "uplink" or multipoint to point, shown diagrammatically in FIG. 1 or else simultaneously pairwise (peer to peer links), represented in FIG. 2. In FIGS. 1 and 2, the letter Ei represents a transmitter, the letter R a receiver and the letters Ui various users, and the letter B the base station.

The present Invention applies, for example, in respect of an "ad hoc" network whose local organization (in the form of a cluster or aggregate) allows the designation of a node (master or coordinator) serving as synchronization reference for the other nodes which are attached to it (FIG. 2) or to networks benefiting from an infrastructure of base station type for cellular networks (FIG. 1). It is assumed moreover that the type of receiver used at each node is a linear receiver of "rake" type, described for example in document [1].

The present invention relates both to general-public applications and professional applications. Professional applications involve, for example, applications of networks of sensors or requiring temporary deployment in zones without infrastructures for intervention teams of the public safety type (firemen, doctors, special forces, maintenance teams in risk zones, etc.). General-public applications involve, for example, applications of telephony or multimedia information transmissions aimed at replacing cables with wireless links.

The invention presents the advantages notably of obtaining time-hopping codes that guarantee high performance, notably in regard to service quality, throughput, operating error probability or of increasing the number of simultaneous users.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

Figure 1:
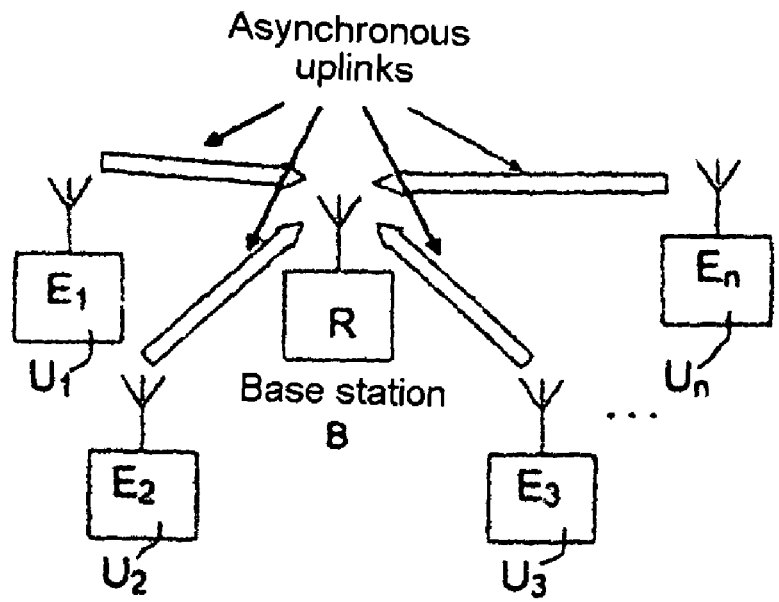
FIG. 1 a communication network comprising a central point.
Figure 2:
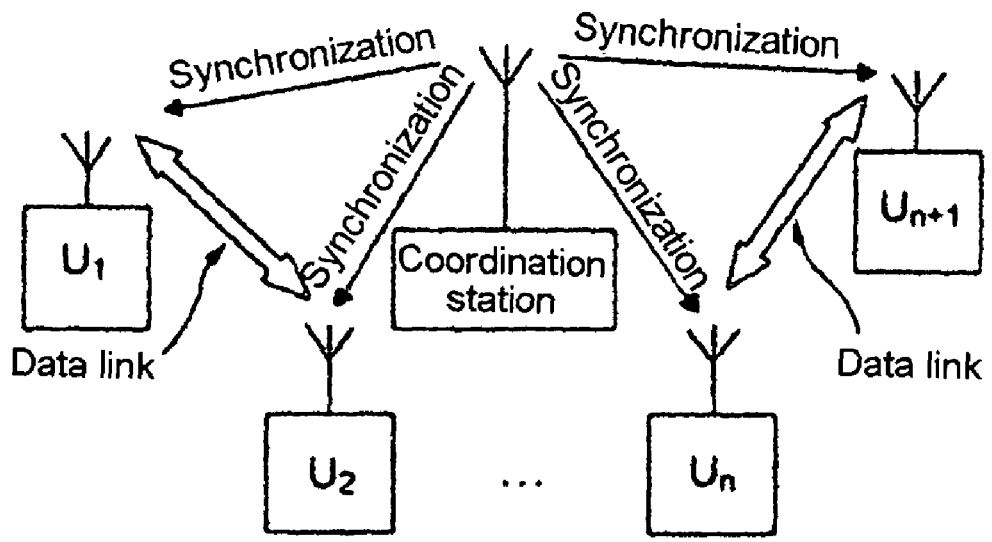
FIG. 2 a communication network with point to point links.

Description of the Codes, Optimization Criterion.

The PPM or pulse position modulated UWB-IR signal transmitted by user n may be written in a conventional manner:

$$s_n(t) = \sqrt{P_n T_f} \sum_k w(t - kT_f - \tilde{c}_n(k)T_c - \delta d_n(\lfloor k/N_f \rfloor) - \theta_n) \quad (1)$$

where $\{\tilde{c}_n(k), k=0, \ldots, N_f-1\}$ is the time-hopping code of user n with values in $[0, \ldots, N_c-1]$, w(t) is the unit energy impulse, $P_n$ is the mean transmission power, $N_f$ is the number of frames per symbol, $T_f$ is the width of the frame, $T_c$ is the width of a code element better known by the term "chip", $\delta$ is the modulation index of the PPM, $d_n(k)$ is the series of symbols with values in $\{0, 1\}$, $\theta_n$ is a random variable equidistributed over $[0, N_f T_f[$ representing the asynchronism between the users, and $\lfloor x \rfloor$ denotes the integer part of x. The argument of the codes $\tilde{c}_n(k)$ in (1) has to be taken modulo $N_f$.

It is assumed that $N_u$ users numbered from 1 to $N_u$ transmit at the same time in a multipath propagation medium.

From the standpoint of a receiver (different from the $N_u$ active transmitters), the expression for the signal received is then given by $$r(t) = \sum_{n=1}^{N_u} r_n(t) + n(t) \quad (2)$$

where n(t) is the noise at the receiver that is assumed to be white and Gaussian and $r_n(t)$ is the signal received originating from user n and the expression for which is:

$$r_n(t) = \sum_{k=1}^{N_p} A_n^k s_n(t - \tau_n^k) \quad (3)$$

where $A_n^k$ and $\tau_n^k$ are respectively the amplitude and the delay of the kth path of the transmission channel between user n and the receiver.

A very general transmission channel model is assumed for which the amplitudes have zero mean (i.e. $E_A[A_n^k]=0$) and are independent (i.e. $E_A[A_n^j A_n^k]=0$ when $j \neq k$). It is assumed moreover that the various random parameters of the model are independent.

Let us assume now that one seeks to demodulate a particular user (user 1 will be chosen subsequently). The term of interest $r_1(t)$ is then identified in the signal received (2):

$$r(t) = r_1(t) + J_1 + n(t), \quad (4)$$

the term $$J_1 = \sum_{n=2}^{N_u} r_n(t)$$

then being identified as the multi-user interference.

The object of the invention consists notably in establishing a criterion which makes it possible to find the codes of the various users making it possible to minimize the variance of this interference so as to guarantee the best performance. It therefore involves calculating the variance of $J_1$ with respect to the random parameters of the model (amplitudes, delays, asynchronism), assuming the codes are deterministic.

In order to facilitate the calculation, (1) for example is represented in an equivalent form, which enables the contribution of the codes to be extracted from inside the argument of w(t). The new representation may be written:

$$s_n(t) = \sqrt{P_n T_f} \sum_k \sum_{j=0}^{N_c N_f - 1} c_n(j) w(t - k N_f T_f - j T_c - \delta d_n(k) - \theta_n)$$

where $\{c_n(j), j=0, \ldots N_c N_f-1\}$ with values in $\{0, 1\}$ are the "developed" codes deduced from $\{\tilde{c}_n(j), j=0, \ldots N_f-1\}$, by the relation:

$$c_n(k) = \begin{cases} 1 & \text{if } k = \tilde{c}_n(j) + jN_c, 0 \le j \le N_f - 1, \\ 0 & \text{otherwise.} \end{cases}, k = 0, \ldots, N_c N_f - 1.$$

Figure 3:
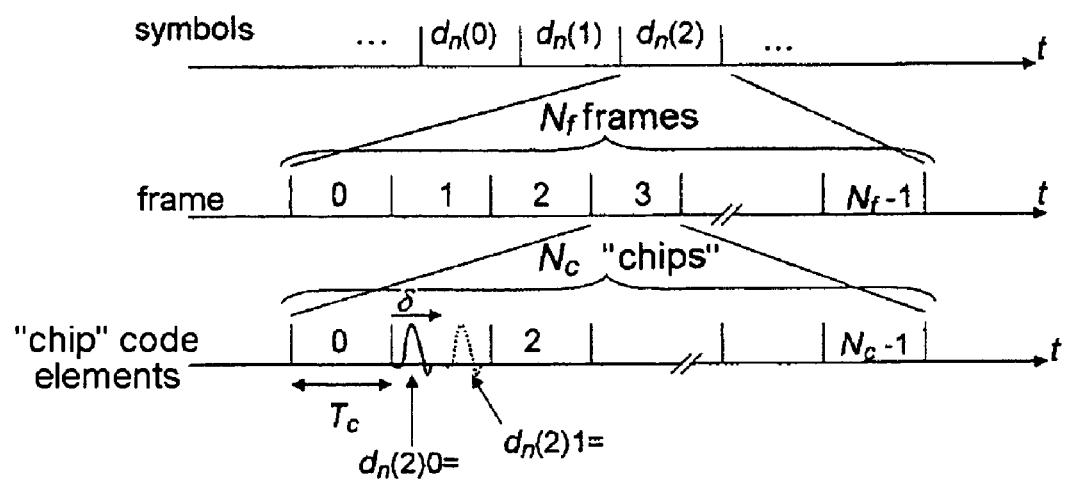
FIG. 3 the positioning of the impulses corresponding to a symbol in a frame.

FIG. 3 illustrates the positioning of the impulses corresponding to a symbol in a frame. The time interval corresponding to a symbol is divided into $N_f$ frames, each containing an impulse. The duration of a frame is divided into $N_c$ "chips", the number of the "chip" in which the impulse is positioned being given by the value of the code $\tilde{c}(k)$. FIG. 3 shows the position of the impulse corresponding to the symbol $d_n(2)$ and frame n°3 which is situated at "chip" n°2, corresponding to the code value $C_n(2*N_c N_f+3*N_c+2)=1$.

The calculation of the variance of the multi-user interference is known to the person skilled in the art and will not be detailed. It follows for example the approach indicated in [5], namely, the successive calculation of the expectation according to the variables: amplitudes, symbols and asynchronism. The following result is obtained:

$$V_{MUI}^{PPM} = E_{A,d,\theta}[J_1^2] = \Psi_1 \cdot \sum_{n=2}^{N_u} P_n \cdot \phi_n \cdot [\kappa_{1,n} + \overline{\gamma} \cdot \xi_{1,n}] \tag{5}$$

where $\Psi_1$ is a constant dependent on the parameters of the propagation channel and the form of the impulse, $\phi_n$ is a constant dependent on the parameters of the channel and $\overline{\gamma}$ is a positive constant dependent on the impulse, with:

$$\kappa_{m,n} = \sum_{q=0}^{N_c N_f - 1} C_{m,n}^{+2}(q) + C_{m,n}^{-2}(q) \tag{6}$$

$$\xi_{m,n} = \sum_{q=0}^{N_c N_f - 1} C_{m,n}^+(q) C_{m,n}^-(q), \tag{7}$$

where $C^+_{m,n}(q)$ and $C^-_{m,n}(q)$ are the cyclic partial correlations between the developed codes of users m and n, defined by:

$$C^-_{m,n}(q) = \sum_{k=0}^{q-1} c_m(k) c_n(k - q), \tag{8}$$

$$C^+_{m,n}(q) = \sum_{k=q}^{N_c N_f - 1} c_m(k) c_n(k - q). \tag{9}$$

The partial correlations being positive or zero, the quantities $\kappa_{m,n}$ and $\xi_{m,n}$ are also positive. Having regard to the positivity of the variables $P_n$, $\phi_n$ and $\overline{\gamma}$, the minimization of (5) according to the codes amounts to minimizing each of the values of the set $\{\kappa_{1,n}+\overline{\gamma} \cdot \xi_{1,n}\}_{n=2}^{N_u}$. It can be proven that the minimum values of $\xi_{1,n}$ and $\kappa_{1,n}$ are respectively 0 and $N_f^2$ and that they can attain these minimum values simultaneously. In this case, the value $\kappa_{1,n}+\overline{\gamma} \cdot \xi_{1,n}$ has then been minimized independently of the value $\overline{\gamma}$. Consequently, the codes minimizing the variance of the multi-user interference (5), are those which satisfy:

$$\xi_{1,n}=0 \text{ and } \kappa_{1,n}=N_f^2, n=2, \ldots, N_u \tag{10}$$

It is possible to characterize these codes in a simpler manner, through the following lemma (not proven here):

$$\xi_{1,n} \text{minimum}(\xi_{1,n} = 0) \text{ and } \kappa_{1,n} \text{minimum}(\kappa_{1,n} = N_f^2) \Leftrightarrow \sum_{q=0}^{N_c N_f - 1} C_{1,n}^2(q) = N_f^2$$

where $C_{m,n}(q)=C_{m,n}^+(q)+C_{m,n}^-(q)$ is the cyclic intercorrelation between the developed code of user m and the code of user n. Thus a criterion equivalent to (10) for describing the set of codes which minimizes the variance of the multi-user interference is:

$$\sum_{q=0}^{N_c N_f - 1} C_{1,n}^2(q) = N_f^2 \quad n=2, \ldots, N_u. \tag{11}$$

It is possible also to establish a third equivalent characterization of the optimality of the codes:

$$\sum_{k=0}^{N_c N_f - 1} c_1(k) c_n(k - q) \le 1, \quad q = 0, \ldots N_c N_f - 1, \quad n = 2, \ldots, N_u \tag{12}$$

The criteria (10), (11) and (12) are equivalent and make it possible to verify whether a code is "optimal" in relation to user 1.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

BIBLIOGRAPHY

[1] M. Z. Win and R. A. Scholtz, "Impulse radio: how it works", IEEE Com. Letters, vol. 2, no. 2, Feb. 1998, pp. 36-38.

[2] M. Z. Win, X. Qiu, R. A. Scholtz, and V. O. K. Li, "ATM-based TH-SSMA network for multimedia PCS", IEEE JSAC, vol. 17, no 5, May 1999, pp. 824-836.

[3] S. S. Kolenchery, J. K. Townsend, and J. A. Freebersyser, "A novel impulse radio network for tactical military wireless communications", IEEE Milcom Conf., Bedford, Mass., USA, Oct. 1998, pp. 59-65.

[4] Ismail Güvenç and Hüseyin Arslan, "Design and performance analysis of TH sequences for UWB-IR systems", in Proc. IEEE Wireless Commun. Networking Conf. (WCNC), vol. 2, pp. 914-919, Atlanta, Ga., 2004.

[5] A-L. Deleuze, C. Le Martret, P. Ciblat, "Time-Hopping Code characterization for multi-user interference mitigation in ultra wide band impulse radio" Signals, Systems and Computers, 2004. Conference Record of the Thirty-Eighth Asilomar Conference on Volume 1, Nov. 7-10, 2004, pp. 617-621.

[6] C. Le Martret, G. B. Giannakis, "All-Digital Impulse Radio with Multiuser Detection for Wireless Cellular Systems", IEEE Trans. on Communications, vol. 50, no 9, pp. 1440-1450, September 2002.

The invention claimed is:

1. A method of multiple access communication in a centralized network based on an ultra wideband impulse physical layer allowing multiple access based on time-hopping codes, each user being associated with a code, the transmission being performed in an asynchronous manner in a propagation medium with multiple paths, wherein a criterion is established so as to find the codes of the Nu various users making it possible to minimize the variance of the multi-user interference $J_n$ at the output of a linear receiver, the signal received r(t) originating from a user being expressed in the form of a sum of the signal of interest $r_n(t)$ originating from user n and of a term corresponding to the multi-user interference, $J_n$ where $$r(t) = r_n(t) + J_n + n(t)$$

with $$r_n(t) = \sum_{k=1}^{N_p} A_n^k s_n(t - \tau_n^k)$$

where $A_n^k$ and $\tau_n^k$ are respectively the amplitude and the delay of the kth path of the transmission channel between user n and the receiver,
and in that to determine the codes of the users use is made of the partial cyclic inter-correlations of the codes which satisfy the following criteria:

$$\sum_{q=0}^{N_c N_f - 1} [C_{m,n}^{+2}(q) + C_{m,n}^{-2}(q)] = N_f^2,$$

$$\sum_{q=0}^{N_c N_f - 1} C_{m,n}^{+}(q) C_{m,n}^{-}(q) = 0,$$

for m=1, ..., $N_u$, n=1, ..., $N_u$ and n≠m, where $N_f$ is the number of frames, $N_c$ is the number of chips, and $N_u$ is the number of users transmitting to the central point or the number of point to point links simultaneously transmitting in a point to point centralized network,
where $C^+_{m,n}(q)$ and $C^-_{m,n}(q)$ are the cyclic partial correlations between the developed codes of users m and n, defined by:

$$C_{m,n}^{-}(q) = \sum_{k=0}^{q-1} c_m(k) c_n(k - q), \text{ and}$$

$$C_{m,n}^{+}(q) = \sum_{k=q}^{N_c N_f - 1} c_m(k) c_n(k - q).$$

2. The method as claimed in claim 1, wherein the communications between the users are point to point or multi-point to point communications.

3. The method as claimed in claim 1, wherein to determine the codes of the users use is made of the inter-correlations of the codes which satisfy the following criterion:

$$\sum_{q=0}^{N_c N_f - 1} C_{m,n}^{2}(q) = N_f^2,$$

for m=1, ..., $N_u$, n=1, ..., $N_u$ and n≠m, where $N_f$ is the number of frames, $N_c$ is the number of chips, and $N_u$ is the number of users transmitting to the central point (in multi-point to point, or uplink mode) or the number of point to point links simultaneously transmitting in a point to point centralized network.

4. The method as claimed in claim 1, wherein to determine the codes of the users use is made of the inter-correlations of the codes satisfying the following criterion:

$$\sum_{k=0}^{N_c N_f - 1} c_m(k) c_n(k - q) \leq 1 \quad q = 0, \ldots N_c N_f - 1,,$$

for m=1, ..., $N_u$, n=1, ..., $N_u$ and n≠m, where $N_f$ is the number of frames, $N_c$ is the number of chips, and $N_u$ is the number of users transmitting to the central point (in multi-point to point or uplink mode) or the number of point to point links simultaneously transmitting in a point to point centralized network.

* * * * *